July 28, 1942. R. STUART 2,291,006
DOCUMENT PHOTOGRAPHING MACHINE
Filed July 16, 1940 2 Sheets-Sheet 1
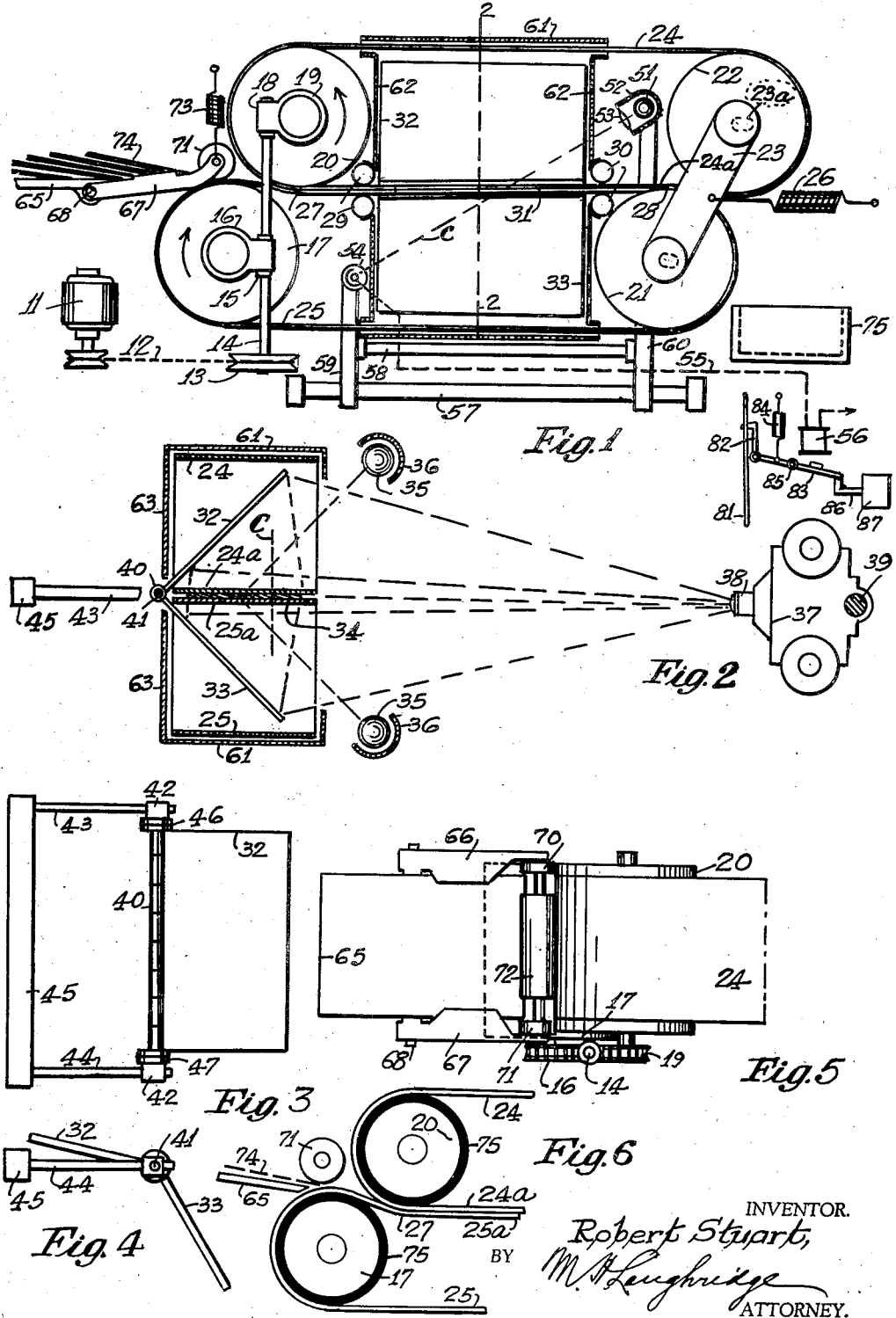

July 28, 1942.   R. STUART   2,291,006
DOCUMENT PHOTOGRAPHING MACHINE
Filed July 16, 1940   2 Sheets-Sheet 2

INVENTOR.
Robert Stuart,
BY M. H. Loughridge
ATTORNEY.

Patented July 28, 1942

2,291,006

UNITED STATES PATENT OFFICE 2,291,006

DOCUMENT PHOTOGRAPHING MACHINE

Robert Stuart, Forest Hills, N. Y.

Application July 16, 1940, Serial No. 345,757

7 Claims. (Cl. 88—24)

This invention relates to document photographing machines and has for an object to provide means for feeding documents to a position to be photographed on one or on both sides; another object of the invention is to feed documents by a pair of transparent belts into position to be photographed; another object of the invention is to provide for feeding and conveying the documents to the photographic position; another object of the invention is to provide a pair of conveyor belts for moving documents with an angularly disposed mirror between the belts for reflecting the image of the document to the camera; another object of the invention is to provide a conveyor system for conveying documents to be photographed with light responsive means operated by the document for controlling the camera. Other objects of the invention will be more particularly understood from the following specification and the accompanying drawings, in which:

Fig. 1 is a side elevation of the photographing machine with the light housing shown in section;

Fig. 2 is a cross section on line 2—2 of Fig. 1 and including the optical system;

Fig. 3 is a plan view of the mirror support used in Fig. 2;

Fig. 4 is an end view of the mirror support shown in Fig. 3;

Fig. 5 is a plan view showing the document feeding table and part of the top belt, and Fig. 6 is a side view of one pair of the belt wheels and the conveyor belts.

Figure 7:
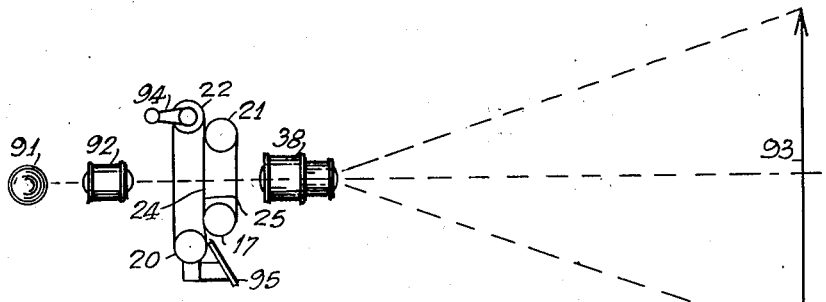
Fig. 7 is a diagram of the invention applied to feeding a transparency to a projector.

A transparent conveyor belt for feeding sheets into an optical field is shown in my co-pending application, Serial No. 253,058, filed January 27, 1939, which has issued as Patent No. 2,227,110 of Dec. 31, 1940. This type of conveyor may be used in a projecting system or in a photographic system. The document that is exposed to the optical field through the transparent conveyor is held flat and taut in this field by the conveyor. The conveyor is readily moved to move the subject across the optical field, to discharge it after it has been exposed and to provide for carrying forward following subjects as may be provided by an automatic feed. When the optical apparatus is located between the sides of a belt, the light is projected through one side of the belt only. The system is fully reversible and may be used for viewing documents in any kind of an optical viewing system.

This invention is shown applied to a machine for photographing bank checks on one, or on both sides, and similar documents for record purposes. The photograph is usually made on a microfilm by a camera adopted for this purpose so that a large number of records can be preserved on a small sized film. The invention comprises an upper transparent belt mounted on a pair of spaced belt wheels and a similar, lower, transparent belt mounted on a pair of belt wheels. The upper wheels are mounted in staggered relation to the lower belt wheels and the adjacent surfaces of the belts are brought into contact under pressure by placing the belt wheel axes somewhat closer than the diameter of the belt wheel. A motor operated mechanism drives the belt wheels at the same speed so that the engaging surfaces of the belt wheels move in the same direction and at the same speed. The documents are fed between the engaging belts and are carried forward into the photographic field to be photographed and to be discharged at the opposite end of the belts.

A photographic field for the documents is provided between the belt wheels and between each belt. This field is preferably protected by a lightproof housing through which the belts move. The photographic field comprises a pair of angularly disposed mirrors in the lightproof housing which are arranged to reflect upon the back and the front of the document as it is moved forward through this field by the engaging belts. The document is suitably illuminated and the photographic camera is located at right angles to the edge of the belts and in focus with the reflecting mirrors.

The camera is preferably operated in synchronism with the movement of the document to the photographic field. For this purpose a light beam with a photo-electric cell and an electric control is provided for the camera; the light beam is interrupted by the document in the photographic field, thereby initiating an operating cycle of the camera.

In the drawings, the motor 11, by belt 12, and belt wheel 13, drives the shaft 14 which, through worm 15 and worm wheel 16, drives the belt wheel 17. The shaft 14 also, through worm 18 and worm wheel 19, drives the belt roller 20. Wheel 21 complementary to wheel 17 carries the belt 25 and wheel 22 complementary to wheel 20 carries the upper belt 24. Wheels 21 and 22 have their bearings mounted in the equalizer 23 which is held under tension by spring 26 so that the tension on each of the belts is equalized. The shaft of roller 22 may be mounted in a slotted guide 23a and a corresponding mounting may be provided for the wheel 21 so that movement of the axis of the wheels 21 and 22, under the action of spring 26, shall be in a substantially straight line.

It will be noted that the rollers 17 and 20 are staggered relative to each other and the rollers 21 and 22 are correspondingly staggered. This permits the upper set of rollers to be brought closer to the lower set of rollers than the vertical distance separating the axis of these rollers. By this construction roller 20 depresses the upper section 25a of the lower belt at 27 and roller 21 depresses the lower side of 24a of the upper belt at 28. This brings the contacting surfaces of the belts into engagement under pressure. The belts 24 and 25 are made of transparent material such as cellulose acetate so that the document can be photographed through these belts. Usually belts of this kind are relatively thin and smooth and in order that the belts may have a proper grip on the driving rollers 17 and 20, these rollers may be constructed as shown in Fig. 6 in which they are provided with a relatively soft rubber tire 75 which increases the friction drive of these rollers.

A light housing 61 is provided between the belt wheels with a rear cover at 63 and with an opening in front towards the camera. This housing is continued between the belts by the members 62 which terminate at the entering rollers 29 and the leaving rollers 30 which rollers maintain the belts flat and straight in the photographic field. The photographic field comprises the mirror 32 located between the upper belt wheels and the mirror 33 located between the lower belt wheels and angularly positioned as shown in Fig. 2 to reflect upon the document 31 as it passes through this field. The document 31 is illuminated by the lights 35—35 and reflectors 36—36 to produce a reflected image of one side of the document on the mirror 32 and a reflected image of the opposite side of the document on mirror 33. The camera 37, adjustably mounted on the shaft 39, is focused by 38 upon the mirrors 32 and 33 and if the camera is operated when the document is in the photographic field, a photograph of both sides of the document will be obtained.

The mirrors 32 and 33 are hinged together as indicated at 40 and supported by a hinge pin 41 which is provided with lugs 42 at the outer ends, one of which is slidably mounted on rod 43 and the other is slidably mounted on rod 44 and the rods 43 and 44 are rigidly supported by 45. This permits the mirrors 32 and 33, when the cover 63 is removed, to be slid back from the zone of the belts and their angular relation to be adjusted as desired. Friction discs are provided at 46 and 47 to hold the mirrors in their adjusted positions. In Fig. 4 the mirror 32 has been moved back to an inactive position and the angle of mirror 33 has been changed so that only one side of a document is photographed by this arrangement. When necessary the camera is adjusted on its support 39 to correspond with the adjustment of mirror 33, Fig. 4.

The documents may be fed to the conveyor belts automatically by a sheet feeding mechanism arranged to do this one at a time. In the arrangement shown in Fig. 1, the documents are fed semi-automatically by an operator moving the document into position to be engaged by the feed roller which carries it forward between the conveyor belts. A feed roller 72 is rotated on the cradle 66, 67, which cradle is pivoted at 68 to the feed table 65 upon which the documents 74 are placed. When the cradle 66, 67, is depressed the roller 72 is depressed against the action of spring 73 until it engages the belt 27 on the wheel 17 and by friction is rotated at the same surface speed as the belt. The roller 72 is provided with end rollers 70 and 71 which are arranged to engage the roller 17 outside of the plane of belt 27 so that the direct friction of the roller 17 may be used to rotate the feed roller 72. The operator moves the top document from the pile 74 against roller 72 and depresses the cradle 66, 67, which feeds this document forward between the engaging belts to the photographic field and to be discharged into the tray 75 at the end of the belts.

The camera mechanism is operated by the light beam c from the light source 51 shielded by 52 and projected by lens 53 upon the photo-cell 54. This light beam passes through suitable apertures in the light housing 62 at right angles to the light in the photographic field. The light influences the photo-cell 54 which includes the usual amplifier, not shown in the drawings, and through connection 55 energizes the translating device, or magnet, 56. Magnet 56 operates armature 83, pivoted at 85, and through hook 82 when the magnet is energized the film 81 is moved forward one frame to make a new exposure. When the magnet 56 is deenergized the spring 84 moves the hook 82 back to a new position to again engage film 81 for another step when 56 is again energized. In this latter movement the armature 83 is brought into engagement with an arm 86 of the shutter mechanism 87 of the camera to produce the exposure at the proper time.

The light source 51 is mounted on a standard 60 and the photo-electric cell 54 is mounted on a standard 59; these standards are connected rigidly by the rod 58, making a frame which slides on bar 57. By sliding this frame on the bar 57 the position in which the light beam c is influenced by the document is adjusted so that the operation of the camera can be timed to photograph documents of different sizes when they are substantially centered in the photographic field.

The operation of the camera mechanism will be understood by considering the established light beam c as energizing magnet 56 which thereby moves the film 81 to a new exposure position and upon the movement of the document between the belts in the photographic field to interrupt the light beam c magnet 56 is deenergized, and the shutter of the camera is thereby operated.

In the arrangement described in Figs. 1 and 2 it is assumed that the camera is capable of taking the photograph of the document as it moves between the belts with such speed that the detail of the photograph will be fully preserved. This may readily be accomplished by adjusting the speed by which the belts move the document to secure the result. This is preferred to the use of a mechanism which would stop the document in the photographic field during the exposure.

The projector in Fig. 7 comprises the light source 91, the condenser lens 92, the transparent belts 24 and 25 and the projector lens 38, projecting the image at 93. Belt 24 is mounted on rollers 20 and 22 and the latter is rotated by the handle 94 to move the transparent belts across the optical field. Belt 25 is mounted on rollers 17 and 21 and is shorter than belt 24 so that rollers 17 and 21 can be located to apply pressure to belt 24, parallel therewith, so that the adjacent sides of belts 24 and 25 are normally held in engagement as they pass through the optical field. The transparency 34a is placed in a guide 95 to be brought into engagement with the belts 24 and 25 and located opposite the exposure position 34 in the optical field by the movement of handle 94. The pressure of the belts against the sheet holds it flat and at right angles to the line of projection.

Figure 8:
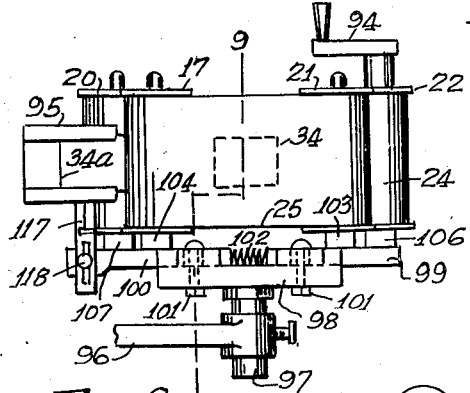
Fig. 8 is a front elevation of the feeding mechanism used in Fig. 7.
Figure 9:
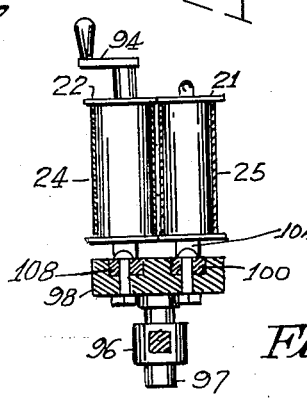
Fig. 9 is a section on line 9—9 of Fig. 8.

One form of the feeding apparatus is shown in Figs. 8 and 9 in which the arm 96 adjustably supports the stem 97 of the base 98 which is provided with a slot for the bars 99 and 100 and which bars are slidably held in place by the bolts 101—101. Bar 99 supports the stem 106 of roller 22 and bar 100 supports the stem 107 of roller 20 on which the transparent endless belt 24 is mounted. A spring 102, between the bars 99 and 100, applies tension to the belt. A corresponding slot is provided in 98 at 108 for a bar supporting stem 103 of roller 21 and a second bar supporting stem 104 of roller 17 on which the transparent belt 25 is mounted. The holder 95 is adjustably mounted by stem 117, secured by a bolt 118 to bar 100. This mechanism is adjustable vertically and transversely by the arm 96 so as to bring the subject into the optical field.

Figure 10:
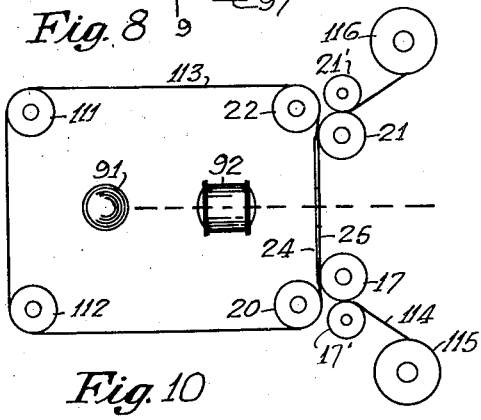
Fig. 10 is a diagram of a modified form of the invention for feeding transparencies to a projector.

In the arrangement in Figs. 8 and 9 the projected light beam passes through both sections of each transparent belt. The arrangement in Fig. 10 avoids this condition and projects the light only through the belts that are held in engagement with the subject between them. For this purpose the belt 24 passes over rollers 20, 22, 111 and 112 as indicated at 113. The rollers 111 and 112 are placed in rear of the projecting apparatus 91 and 92 so that this apparatus is located within the belt and only one portion of this belt intervenes between the subject and the projector. The outer belt 25 passes over rollers 17 and 21 and under tensioning rollers 17' and 21'. One end of this belt 114 is taken up from reel 115 and the opposite end is wound on reel 116. In this application, instead of using the endless belt, a single transparent band is used wound from one reel to another and after it has been wound in one direction it is then reversed by reversing the movement of belt 24.

This mechanism feeds a sheet into an optical field in condition for viewing or projecting and does not require glass plates or other stiffening devices to hold the subject in proper condition.

Having thus described my invention, I claim:

1. A document photographing machine comprising a pair of endless belts at least one of which is of transparent material, each mounted on belt wheels, and having the sides of the belts moving in the same direction placed in contact with each other, means for driving said belts at the same speed, a mirror angularly disposed relative to said belts and located to reflect upon the transparent belt, a light housing for said mirror and belts, rollers forming part of the housing and engaging said belts where they enter and leave the housing to hold the belts in position to grip the document fed between said adjacent belts to pass through the field of said mirror, means for illuminating said belts in said light housing and a camera for photographing the document as reflected in the mirror.

2. A document photographing machine comprising a pair of endless belts of transparent material, each mounted on belt wheels and having the sides of the belts moving in the same direction in contact with each other, means for driving said belts at the same speed, means for feeding documents between said adjacent belts, a mirror for reflecting the image of said documents, a camera for photographing the image on the mirror, an electric device for controlling the operation of the camera, a photo-cell for operating said electrical device, a light source with a beam intercepted by the movement of the document for controlling the photo-cell, a frame rigidly connecting said photo-cell and light source, and means for adjusting the position of said frame relative to the document.

3. A document photographing machine comprising a pair of endless belts of transparent material each mounted on belt wheels and having the sides of the belts moving in the same direction placed in contact with each other, means for feeding documents between said belts, means for driving said belts at the same speed, a pair of angularly disposed mirrors located between the belt wheels to reflect upon the adjacent sides of the belts, a frame for said pair of mirrors, a shaft parallel with said belts supporting said frame and a slide for said shaft, whereby the mirrors may be removed from between the belts, means for illuminating the document and a camera for photographing the document on the mirrors.

4. A document photographing machine comprising a pair of endless belts of transparent material each mounted on belt wheels, and having the sides of the belts moving in the same direction placed in contact with each other, means for feeding documents between said belts, means for driving said belts at the same speed, a pair of angularly disposed mirrors located between the belts to reflect upon the adjacent sides of the belts, a shaft parallel with said belts, a frame pivotally mounting said mirrors on said shaft, means for adjusting the angle of each mirror on its pivot relative to the belts, means for illuminating the document and a camera for photographing the document on the mirrors.

5. A document photographing machine comprising a pair of endless belts of transparent material, belt wheels for said belts supporting one belt upon the top of the other with the axis of the top belt wheels staggered with relation to the axis of the lower belt wheels, said axes being spaced less than the diameter of the belt wheels apart to force the side of one belt against the side of the other belt moving in the same direction, a table for the documents, a cradle with a feed roller located above the projecting belt at the end of the table and arranged to engage the document, and a drive roller for the feed roller located outside the plane of the belt, means normally holding said feed roller free of the belt, said cradle bringing said drive roller into engagement with the belt wheel as a document is fed to the machine to move the document into engagement with the adjacent belts, and means for photographing the documents in their passage along the belts.

6. Means for locating a sheet in an optical field comprising a first roller on a fixed support, a floating arm, a second roller mounted at the end of said arm, a first transparent endless belt mounted on said rollers, a third roller on a fixed support, a fourth roller mounted on the opposite end of said arm, a transparent endless belt mounted on said third and fourth rollers, parallel with the first belt and in contact therewith, a spring connected to said arm intermediate its ends for applying tension to said belts, an optical field traversing said belts where they are in contact, means for feeding the sheet between the sides of said belts in contact and means for moving said belts to move the sheet into the optical field.

7. Means for locating a sheet in an optical field comprising a first roller on a fixed support, a floating arm, a second roller mounted at the end of said arm, a first transparent endless belt mounted on said rollers, a third roller on a fixed support, a fourth roller mounted on the opposite end of said arm, a transparent endless belt mounted on the third and fourth rollers parallel with the first belt and in contact therewith, the axes of the adjacent rollers being staggered with relation to each other and being spaced less than the diameter of the rollers apart, a spring connected to said arm intermediate its ends for applying tension to said belts, an optical field traversing said belts where they are in contact, means for feeding the sheet between the sides of said belts in contact and means for moving said belts to move the sheet into the optical field.

ROBERT STUART.